(12) United States Patent
Cattoor et al.

(10) Patent No.: US 12,007,004 B2
(45) Date of Patent: Jun. 11, 2024

(54) ELECTRIC DRIVE UNIT WITH A MULTI-SPEED TRANSMISSION AND METHOD FOR TRANSMISSION OPERATION

(71) Applicant: Dana Belgium N.V., Flanders (BE)

(72) Inventors: Kurt Cattoor, Koolkerke (BE); Filip Van Raepenbusch, Bruges (BE); Filip D. Schacht, Meulebeke (BE); Joachim Van Dingenen, Drongen (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 17/661,717

(22) Filed: May 2, 2022

(65) Prior Publication Data
US 2023/0349447 A1    Nov. 2, 2023

(51) Int. Cl.
*F16H 3/093* (2006.01)
*B60K 1/02* (2006.01)
(Continued)

(52) U.S. Cl.
CPC .............. *F16H 3/093* (2013.01); *B60K 1/02* (2013.01); *B60K 17/08* (2013.01);
(Continued)

(58) Field of Classification Search
CPC .................. F16H 3/093; F16H 57/0409; F16H 2200/0021; F16H 2003/0935;
(Continued)

(56) References Cited

U.S. PATENT DOCUMENTS 5,263,906 A * 11/1993 Antonov ............... F16D 25/123
475/330
8,522,634 B2 * 9/2013 Bridges .................. B60K 6/547
74/331
(Continued)

FOREIGN PATENT DOCUMENTS

CN        111890904 A    11/2020
CN        217415442 U  *  9/2022
(Continued)

OTHER PUBLICATIONS

English Language translation of CN-217415442-U (Year: 2022).*

*Primary Examiner* — Victor L MacArthur
(74) *Attorney, Agent, or Firm* — McCoy Russell LLP

(57) ABSTRACT

Systems and methods for an electric drive unit are provided. A transmission system in an electric drive unit, in one example includes an input shaft rotationally coupled to each of a first electric machine and a second electric machine and a first clutch arranged coaxial to a first countershaft, where a first gear is fixedly coupled the first clutch and meshes with a second gear that is fixedly coupled to the input shaft. The transmission system further includes a second clutch arranged coaxial to a second countershaft and spaced away from the first countershaft and a third gear that is fixedly coupled to the second clutch and meshes with the first gear, where the first clutch and the second clutch are configured to shift the transmission system between multiple gear ratios and deliver mechanical power to an output shaft that is spaced away from the second countershaft.

13 Claims, 5 Drawing Sheets

(51) Int. Cl.
- *B60K 17/08* (2006.01)
- *F16H 57/04* (2010.01)
- *B60L 50/60* (2019.01)

(52) U.S. Cl.
CPC .......... *F16H 57/0409* (2013.01); *B60L 50/60* (2019.02); *F16H 2200/0021* (2013.01)

(58) Field of Classification Search
CPC ............ F16H 2200/0034; F16H 3/727; F16H 61/061; B60K 1/02; B60K 17/08; B60L 50/60; B60L 2220/42; H02P 5/74; H02P 5/747; B60W 10/02; B60W 10/08
See application file for complete search history.

(56) References Cited

U.S. PATENT DOCUMENTS

| | | |
|---|---|---|
| 9,568,066 B2 | 2/2017 | Yang et al. |
| 10,144,309 B2 | 12/2018 | Leng et al. |
| 2014/0026988 A1* | 1/2014 | Peterson ............. F16H 57/0447 137/544 |
| 2015/0112560 A1* | 4/2015 | Bremner ............. F16H 61/0213 701/60 |
| 2020/0149622 A1* | 5/2020 | Kuhl ........................ F01M 1/12 |
| 2023/0029811 A1* | 2/2023 | Stålberg .................. F16H 3/085 |

FOREIGN PATENT DOCUMENTS

| | | |
|---|---|---|
| DE | 102016220511 A1 | 4/2018 |
| EP | 2995488 A1 | 3/2016 |
| EP | 3098103 A1 | 11/2016 |

\* cited by examiner

US 12,007,004 B2

ELECTRIC DRIVE UNIT WITH A MULTI-SPEED TRANSMISSION AND METHOD FOR TRANSMISSION OPERATION

TECHNICAL FIELD

The present disclosure relates to a multi-speed transmission system in an electric drive unit and a transmission shifting method.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Certain electric drive units have used planetary gear sets to achieve gear reduction and drive unit profile targets. Further, dual-motors have been utilized in some electric drive units to increase the drive unit's power output and control adaptability.

U.S. Pat. No. 10,144,309 B2 to Leng et al. provides a dual-motor drive unit for an all-electric vehicle. The dual motor drive unit includes two motors that are coaxially arranged with a synchronizer. The synchronizer is positioned on an input shaft and is designed to achieve optimal synchronization efficiency based on the working points of the two motors. Further, in Leng's drive unit, a shaft which functions as an output for a differential includes three gears positioned thereon.

The inventors have recognized several drawbacks with Leng's dual motor drive unit as well as other previous electric drives. For instance, positioning the synchronizer on the input shaft increases the width of the transmission which may impose barriers to integration in certain vehicle platforms. Further, the drop of Leng's drive unit may be incompatible in certain vehicles that demand longer drops due to the packaging demands of surrounding vehicle systems. For instance, Leng's drive unit may be incompatible with certain vehicles such as all-wheel drive loaders. Further, due to the layout of the synchronizer and associated gear reductions on downstream shafts the unit's width may not meet packaging demands of some vehicles. Other dual-motor electric drives have been unable to achieve desired sizing constraints, specifically with regard to drop and width, for some vehicle types due to the use of planetary assemblies in the gear train.

The inventors have recognized the aforementioned issues and developed a transmission system in an electric drive unit. The transmission system, in one example, includes an input shaft rotationally coupled to each of a first electric machine and a second electric machine. In such an example, the transmission system further includes a first clutch arranged coaxial to a first countershaft. In the system, a first gear is fixedly coupled the first clutch and meshes with a second gear that is fixedly coupled to the input shaft. The transmission system further includes a second clutch that is arranged coaxial to a second countershaft and spaced away from the first countershaft. The system further includes a third gear that is fixedly coupled to the second clutch and meshes with the first gear. Further in the system, the first clutch and the second clutch are configured to shift the transmission system between multiple gear ratios and deliver mechanical power to an output shaft that is spaced away from the second countershaft. In this way, the transmission system achieves a desired width and drop that facilitates efficient integration of the system into desired vehicle platforms. For instance, the transmission system may be efficiently incorporated into an installation envelope of a loader or other suitable type of vehicle.

Further in one example, the first clutch may be configured to, when engaged, rotationally couple the first gear to a fourth gear. In such an example, the fourth gear is arranged coaxial to the first countershaft and meshes with a fifth gear that is fixedly coupled to the second countershaft. Still further in such an example, the second clutch is configured to, when engaged, rotationally couple the third gear to the fifth gear. Further, the fifth gear meshes with a sixth gear that is fixedly coupled to the output shaft. Additionally, the third gear and the fifth gear may be positioned on opposing lateral sides of the second clutch. Arranging the third and fifth gears on opposing sides of the second clutch allows the clutch to be compactly packaged below the first clutch, thereby allowing the transmission to realize a desired drop and width demanded in certain space constrained vehicle envelopes.

The first and second clutches may be friction clutches, one example. In this way, the transmission is capable of efficiently powershifting between multiple operating gears. Power interruptions during shifting transients may therefore be reduced (e.g., avoided), thereby enhancing transmission performance and customer appeal.

The transmission system may further include a scavenger pump with a pick-up positioned in a sump of a housing that at least partially encloses the first clutch and the second clutch. In this way, lubricant may be removed from the transmission housing to reduce splash losses and increase transmission operating efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
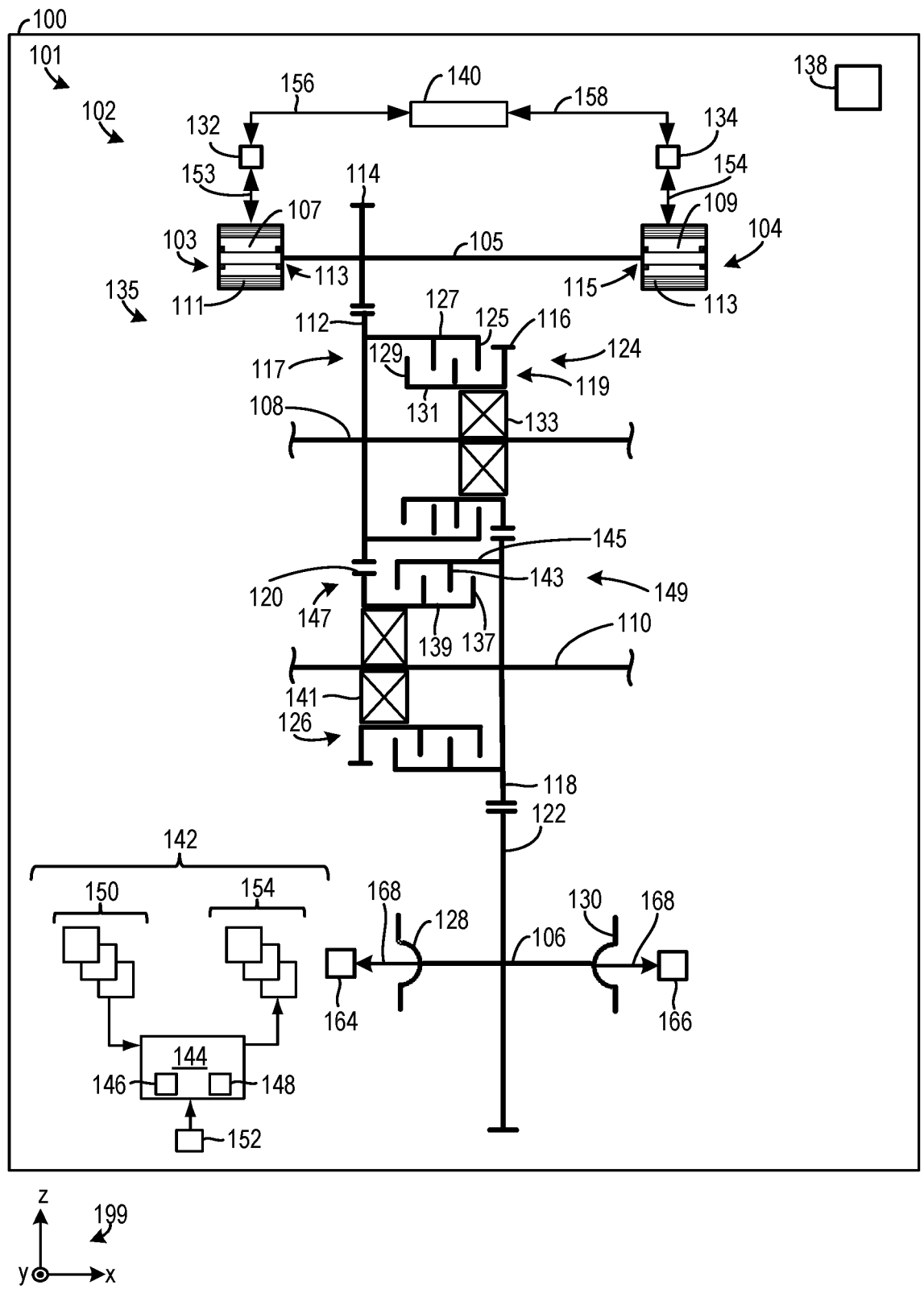
FIG. 1 is a stick diagram of an electric drive unit with a transmission system.

FIG. 1 depicts an electric vehicle (EV) 100 with an electric drive unit 101 that generates motive power for vehicle propulsion. The EV 100 may be a light, medium, or heavy duty vehicle. Specifically, in one use-case example, the vehicle may be a loader type vehicle with a bucket 138 that is designed to scoop loose material in industrial, agricultural, or construction environments. However, in other examples, the EV 100 may be a passenger vehicle such as a truck, sedan, wagon, and the like. Further, the EV 100 may be a battery electric vehicle (BEV), in one example, or a hybrid electric vehicle (HEV) that includes an internal combustion engine, in another example.

The electric drive unit 101 includes a transmission system 102, a first electric machine 103, and a second electric machine 104. As illustrated, the first electric machine 103 is arranged coaxial to the second electric machine 104 which may provide a desired mass balance in the electric drive unit. To elaborate, the first electric machine 103 is coupled to a first end 113 of an input shaft 105 and the second electric machine 104 is coupled to the opposite end 115 of the input shaft 105. Arranging the electric machines in this manner enables the electric drive unit to achieve a desired weight distribution and axial separation between the machines for efficient packaging within the vehicle. However, other electric machines arrangements may be used in other examples. However, the electric machines may not be coaxially arranged, in other examples. The electric machines 103, 104 may be designed to provide a desired amount of tractive effort at stall to load the bucket 138 and a target top speed, if so desired. The use of the dual-motors in the electric drive unit therefore enables the unit to attain end-use performance goals. The bucket 138 may be hydraulically operated, in one example. The hydraulics controlling the bucket may therefore be pressurized via an electric pump in such an example.

Each of the electric machines 103, 104 may include conventional components such as rotors 107, 109 and stators 111, 113 that electromagnetically interact during operation to generate motive power. Further in one example, the electric machines may be motor-generators which are designed to generate electrical energy during regeneration operation. Still further, the electric machines may have similar designs and sizes, in some instances. In this way, manufacturing efficiency may be increased. However, the electric machines may have differing sizes and/or designs, in alternate examples.

The electric machines 103, 104 may be electrically coupled to one or more energy storage device(s) 140 (e.g., one or more traction batteries, capacitor(s), combinations thereof, and the like) by way of inverters 132, 134 when the machines are designed as alternating current (AC) machines. Arrows 153, 154, 156, and 158 denote the electrical connection between the electric machines 103 and 104, the inverters 132 and 134, and the energy storage device(s) 140. These inverters and the other inverters described herein are designed to convert direct current (DC) to AC and vice versa. In one use-case example, the electric machines 103, 104 and the inverters 132, 134 may be three-phase devices which can achieve greater efficiency when compared to other types of motors. However, motors and inverters designed to operate using more than three phases have been envisioned.

Further, the transmission system 102 contains a multi-speed transmission 135 with a first countershaft 108 and a second countershaft 110 that each include gears and clutches coupled thereto. A gear 114 is rotationally coupled to the input shaft 105 and therefore rotates therewith. The gears described herein include teeth, and mechanical attachment between the gears involves meshing of the teeth.

The transmission 135 further includes a first clutch 124. The first clutch is specifically illustrated as a friction clutch. A friction clutch, as described herein, may include two sets of plates designed to frictionally engage and disengage one another while the clutch is opened and closed. As such, the amount of torque transferred through the clutch may be modulated depending on the degree of plate engagement.

The first clutch 124 specifically includes a first set of plates 125 that are coupled to the gear 112 and rotate therewith, during transmission operation. The first set of plates 125 may specifically be included in a clutch drum 127 that is coupled to or formed with the gear 112 on its exterior. A gear 116 is fixedly coupled to the first clutch 124 and meshes with the gear 114. To elaborate, a second set of plates 129 in the first clutch are fixedly coupled to a gear 116 such that they rotate therewith. The second set of plates 129 may specifically be included in a clutch hub 131 that is formed with or otherwise fixedly coupled to the gear 116. As such, the second set of plates 129, the clutch hub 131, and the gear 116 rotate in unison.

As such, during engagement of the first clutch 124 mechanical power is transferred from the gear 112 to the gear 116, which causes the gear 116 to rotate dependently with regard to the first countershaft 108. Conversely, when the first clutch is disengaged, the gear 116 rotates freely and independently with regard to the first countershaft 108. The gear 116 meshes with a gear 118 that is fixedly coupled to a second countershaft 110 and therefore rotates therewith during transmission operation. A bearing 133 may be coupled to the first countershaft 108 and the gear 116 and/or the clutch hub 131 to enable the clutch hub to independently rotate with regard to the first countershaft 108 during clutch disengagement. A bearing as described herein may include inner races, outer races, and roller elements (e.g., balls, cylindrical rollers, tapered cylindrical rollers, and the like).

The gears 112 and 116 are positioned on opposing sides 117 and 119 of the first clutch 124 to allow the clutch to be efficiently coupled to the input shaft 105 and the second countershaft 110. The electric drive unit 101 may therefore achieve greater space efficiency and specifically a desired lateral width.

The friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The first clutch 124 and the other clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

A second clutch 126 is further included in the transmission 135. The second clutch 126 is positioned coaxial to the second countershaft 110 is therefore spaced away from the first clutch 124. The second clutch 126 is illustrated as a friction clutch although other types of clutches may be used in other examples. When friction clutches are used, the transmission 135 is able to powershift between operating gears with a decreased amount of power interruption when compared to transmissions using dog clutches, thereby increasing transmission efficiency during shifting transients as well as customer appeal.

The second clutch 126 include a first set of plates 137 that is fixedly coupled to a gear 120 which meshes with the gear 112. The first set of plates 137 may be included in a clutch hub 139 that is formed with or otherwise fixedly coupled to the gear 120. A bearing 141, coupled to the second countershaft 110, the gear 112, and/or the clutch hub 139. As such, gear 112 independently rotates with regard to the second countershaft 110 when the second clutch 126 is disengaged. The second clutch further include a second set of plates 143 that are formed with or otherwise fixedly coupled to the gear 118 and therefore rotate therewith. To expound, the second set of plates 143 may be formed in or otherwise fixedly coupled to a clutch drum 145 that is coupled to the gear 118. When the second clutch is engaged, mechanical power is transferred from the gear 120 to the gear 118, which causes the gear 120 to rotate dependently with regard to the second countershaft 110. Conversely, when the second clutch is disengaged, the gear 120 rotates freely and independently with regard to the second countershaft 110, as previously indicated.

The gear 120 and the gear 118 are positioned on opposing lateral sides 147 and 149 of the second clutch 126. To elaborate, in the illustrated example, the outer diameter of the gear 112 is greater than the outer diameter of the clutch drum 127 and the outer diameter of the gear 120 is less than the diameter of the clutch drum 145. Similarly, the outer diameter of the gear 118 is larger than the outer diameter of the clutch drum 145 and the outer diameter of the gear 116 is less than the outer diameter of the clutch drum 127. In this way, the transmission is able to achieve target gear ranges while efficiently packaging the second clutch 126 between the gears 118 and 120 and at least partially below the first clutch 124, if wanted. Consequently, the transmission is capable of compactly fitting into design envelopes of some space constrained vehicle platforms such as loader vehicles while meeting their end-used design goals with regard to gearing and shifting. However, the gears and clutches may have alternate sizes and/or positions, in alternate embodiments.

The gear 118 meshes with a gear 122 that is fixedly coupled the output shaft 106. Specifically, in the illustrated example, a single gear is fixedly coupled to the output shaft 106. Designing the output shaft with a single gear coupled thereto enables the axial width of the shaft (measured from the output flange 128 to the output flange 130) to be decreased when compared to shafts with multiple gears arranged thereon. Consequently, the electric drive unit 101 may achieve greater space efficiency which allows it to be packaged in a wider number of vehicle platforms. For instance, the comparatively small width of the output shaft allows the electric drive unit to be efficiently incorporated into certain loader vehicles which may impose space constraints on the output shaft. Further, utilizing multiple countershafts with clutches positioned thereon allows drive unit to achieve a desired output width, multi-speed functionality, and a desired drop which may be demanded in certain vehicles such as loaders.

The output shaft 106 includes output interfaces 128, 130 that are designed to attach to axles 164 and 166 (e.g., front and rear axles), respectively, via shafts, coupling, chains, combinations thereof, and the like as denoted via arrows 168. The axles 164, 166 may include components such as differentials, axle shaft, and drive wheels. As such, the electric drive unit 101 may be desired for a four-wheel drive vehicle. The output interfaces 128, 130 are specifically illustrated as flanges. However, other suitable types of mechanical interfaces have been contemplated such as yokes, splines, joints, combinations thereof, and the like.

The vehicle 156 further includes a control system 142 with a controller 144 as shown in FIG. 1. The controller 144 may include a microcomputer with components such as a processor 146 (e.g., a microprocessor unit), input/output ports, an electronic storage medium 148 for executable programs and calibration values (e.g., a read-only memory chip, random access memory, keep alive memory, a data bus, and the like). The storage medium may be programmed with computer readable data representing instructions executable by a processor for performing the methods and control techniques described herein as well as other variants that are anticipated but not specifically listed.

The controller 144 may receive various signals from sensors 150 coupled to various regions of the vehicle 156 transmission 135. For example, the sensors 150 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 152 (e.g., accelerator pedal, brake pedal, drive mode selector, combinations thereof, and the like) may further provide input signals indicative of an operator's intent for vehicle control.

Upon receiving the signals from the various sensors 150 of FIG. 1, the controller 144 processes the received signals, and employs various actuators 154 of vehicle components to adjust the components based on the received signals and instructions stored on the memory of controller 144. For example, the controller 144 may receive an accelerator pedal signal indicative of an operator's request for increased vehicle acceleration. In response, the controller 144 may command operation of the inverters 132, 134 to adjust electric machine power output and increase the power delivered from the machines 103, 104 to the transmission 135. The controller 144 may, during certain operating conditions, be designed to send commands to the clutches 124, 126, to engage and disengage the clutches. For instance, a control command may be sent to the clutch 124 and in response to receiving the command, an actuator in the clutch may adjust the clutch based on the command for clutch engagement or disengagement. The other controllable components in the vehicle may function in a similar manner with regard to sensor signals, control commands, and actuator adjustment, for example.

An axis system 199 is provided in FIG. 1 as well as FIGS. 2A-2B and 3A-3B, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2A:
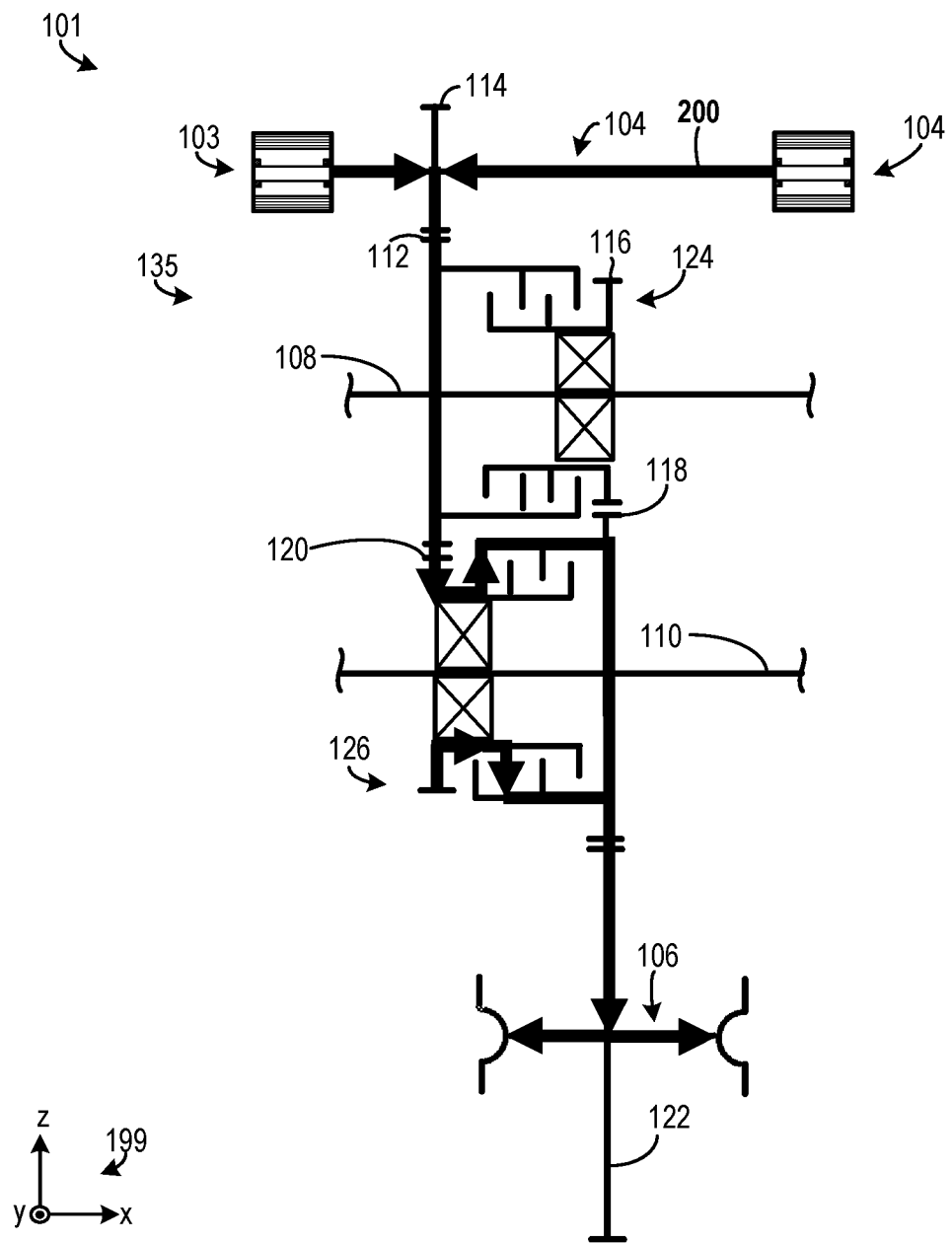
FIGS. 2A and 2B are power path diagrams for the different operating gears of the electric drive unit, depicted in FIG. 1.
Figures 2B, 2C:
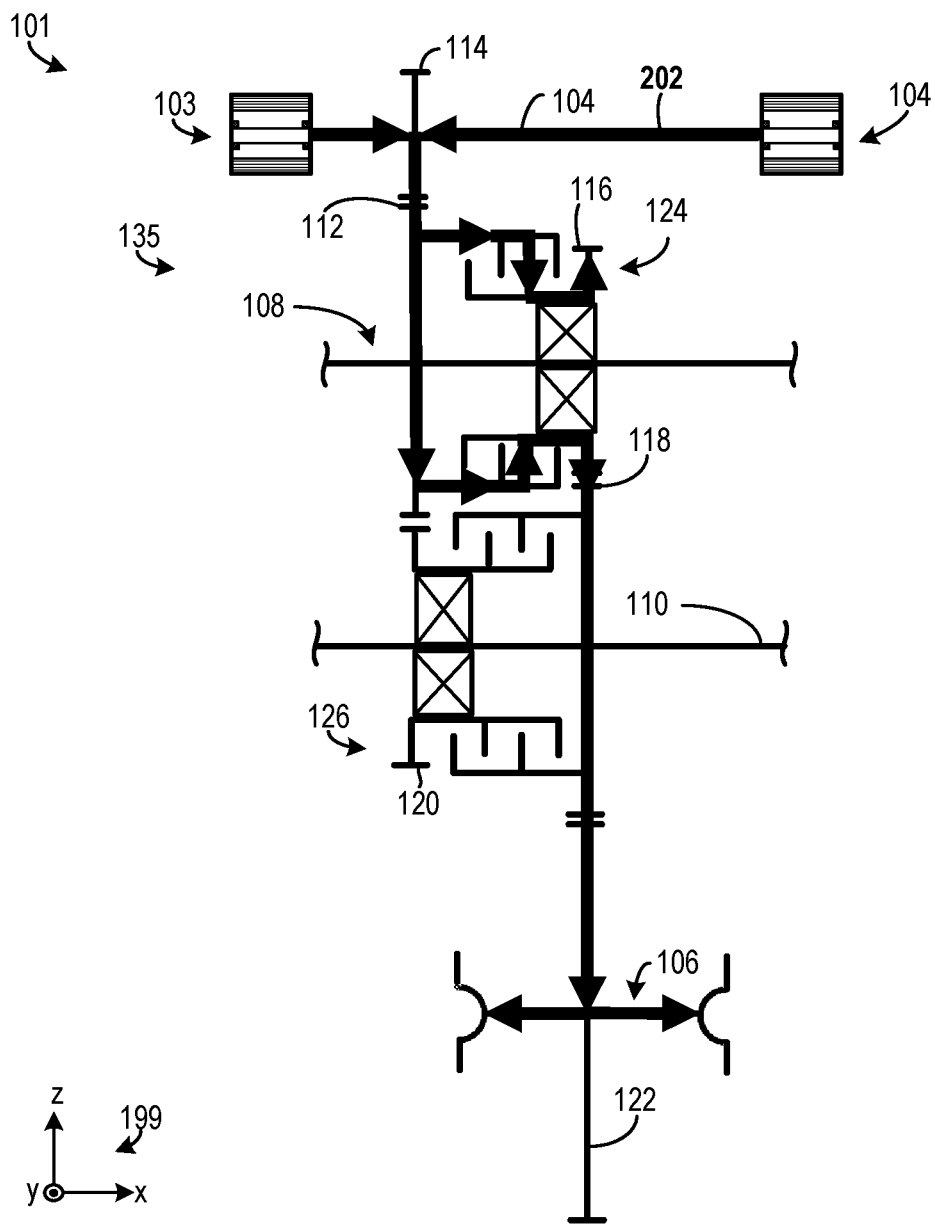
FIG. 2C is a table that indicates configurations of the clutches in the operating gears of the transmission system, depicted in FIG. 1.

FIGS. 2A and 2B show the power paths 200 and 202 through the transmission 135 in the electric drive unit 101 in a higher gear mode and a lower gear mode, respectively. The gear ratio of the transmission in the higher gear mode is therefore higher than the gear ratio in the lower gear mode. It will be understood that these power paths may correspond to both forward and reverse drive modes. Further, the electric machines may generate rotational output in opposite directions in the forward and reverse drive modes. In other words, in a forward drive mode, the first electric machine may rotate the output shaft 106 in a first direction and in a reverse drive mode, it may rotate the output shaft in the opposite direction. Thus, the power paths shown in FIGS. 2A and 2B generally correspond to drive mode operation.

As illustrated in FIG. 2A, while the transmission 135 is operating in the higher gear mode, the first clutch 124 is disengaged and the second clutch 126 is engaged. The mechanical power path 200 unfolds as follows: mechanical power moves from the first and second electric machines 103, 104 to the gear 114; from the gear 114 to the gear 112; from the gear 112 to the gear 120; from the gear 120 to the gear 118; from the gear 118 to the gear 122; from the gear 122 to the output shaft 106; and from the output shaft to the downstream components. As such, in the higher gear mode of operation, the power path 200 bypasses the gear 116.

While the transmission 135 is operating in the lower gear mode, as shown in FIG. 2B, the first clutch 124 is engaged and the second clutch 126 is disengaged. The mechanical power path 202 unfolds as follows: mechanical power moves from the first and second electric machines 103, 104 to the gear 114; from the gear 114 to the gear 112; from the gear 112 to the gear 116; from the gear 116 to the gear 118; from the gear 118 to the gear 122; from the gear 122 to the output shaft 106; and from the output shaft to downstream components. As such, in the lower gear mode of operation, the power path 202 bypasses the gear 120.

FIG. 2C shows a table 250 that indicates the configurations of the first clutch 124 and the second clutch 126 in the lower gear mode and the higher gear mode. As previously indicated, in the lower gear mode, the first clutch is engaged and the second clutch is disengaged and conversely, in the higher gear mode the first clutch is disengaged and the second clutch is engaged.

Figure 3A:
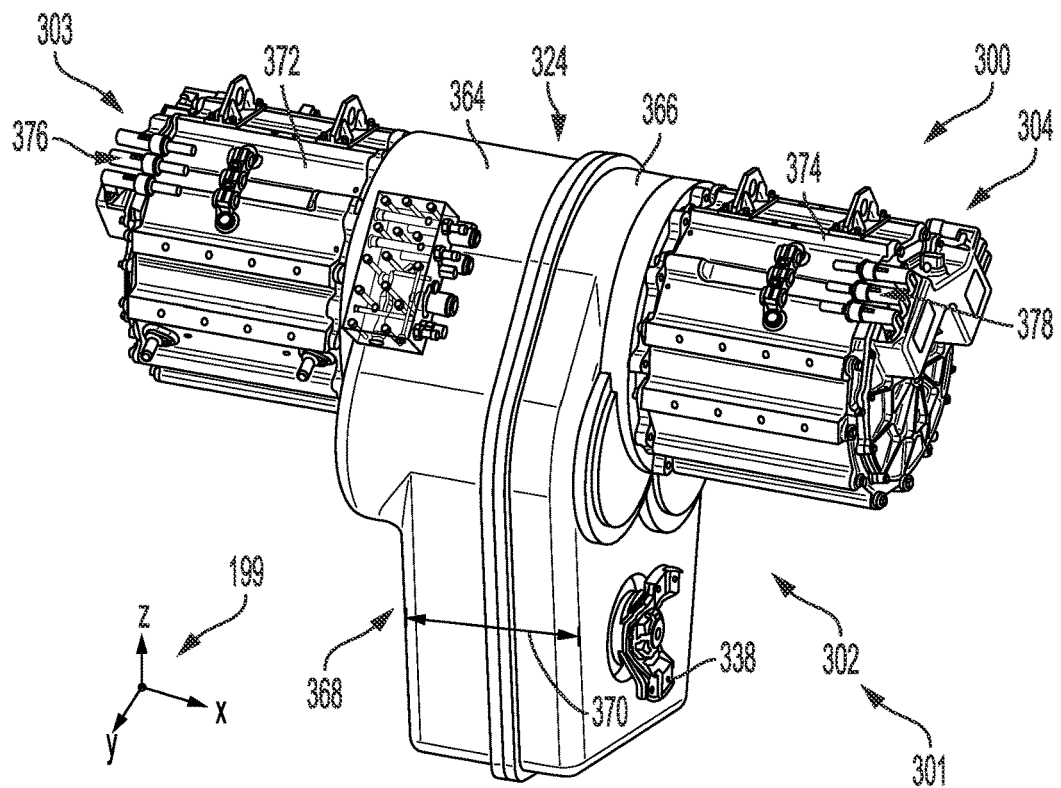
FIGS. 3A and 3B are detailed illustrations of an example of an electric drive unit with a multi-speed transmission.
Figure 3B:
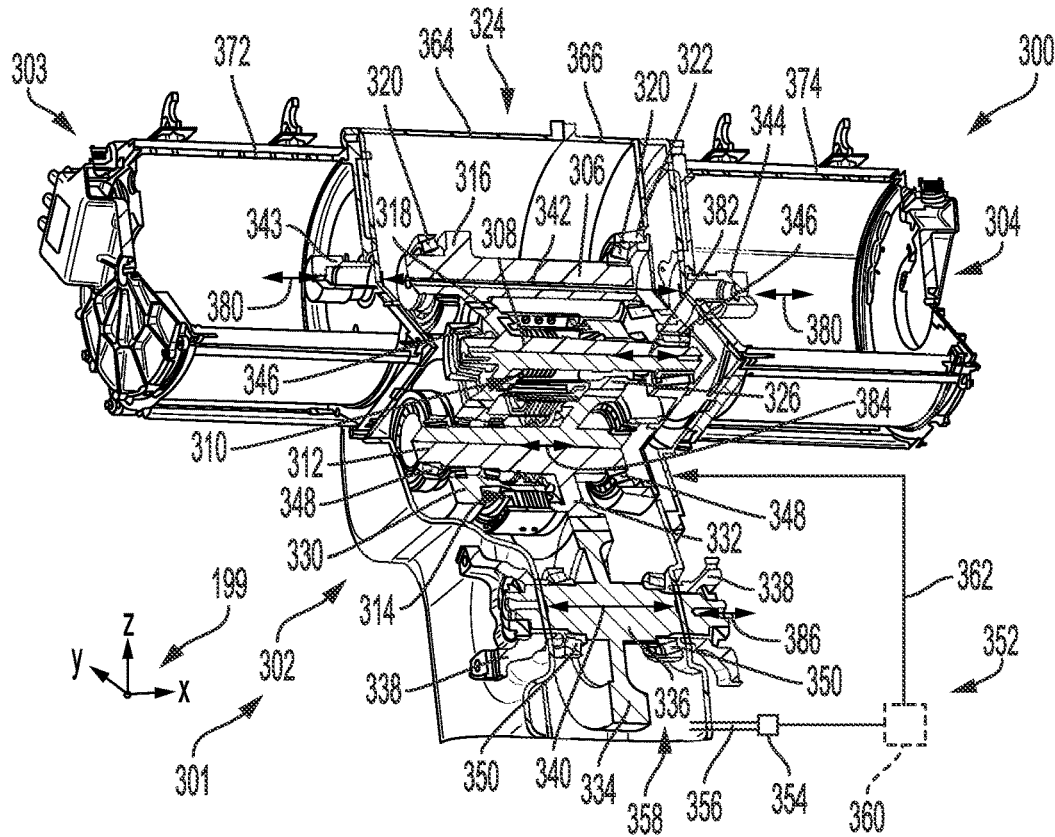

FIGS. 3A and 3B depict an example of an electric drive unit 300 with a transmission system 301 that includes a transmission 302. It will be understood that the electric drive unit 300 and transmission system 301, shown in FIGS. 3A and 3B, and the electric drive unit 101 and transmission system 102, shown in FIG. 1, may have at least some overlapping components with regard to component structure and/or function. FIG. 3B specifically shows a cross-sectional view where cross-sections are cut into the transmission system at rotational axes of an input shaft, a second countershaft, and an output shaft.

The electric drive unit 300 again includes a first electric machine 303 and a second electric machine 304 and the transmission system 301 again includes an input shaft 306, a first countershaft 308 with a first clutch 310 positioned coaxial thereto, and a second countershaft 312 with a second clutch 314 positioned coaxial thereto. The first clutch 310 and the second clutch 314 are illustrated as friction clutches. However, as previously indicated other types of clutches have been contemplated.

Again, a gear 316 is fixedly coupled to the input shaft 306 that meshes with a gear 318 that is fixedly coupled to the first countershaft 308. To achieve the coupling between the gears and the shafts the gears may be formed on the shaft via machining or attached to the shafts via splines and/or welds, for instance. In this way, these gears and shafts rotate in unison during transmission operation. The ratio of the gear 316 and the gear 318 may be a relatively high ratio to reduce the delta speed in the first and second clutches 310 and 314, thereby reducing drag losses. For instance, the ratio between the gears 316 and 318 may be 2.2:1, in one specific example. However, the ratio of the gears 316 and 318 may be selected based on a number of factors such as motor speed range, expected motor load, vehicle weight, and the like. Further, in one use-case example the overall gear ratio of the transmission in the lower gear may be 3.2:1 and the overall gear ratio of the transmission in the higher gear mode may be 1.6:1. Further, in such an example, the spread between the high and low gear ratios may be 2. However, other suitable transmission operating gear ratios have been contemplated.

Bearings 320 are coupled to opposing sides of the input shaft 306 and may be mounted in sections 322 of a housing 324 to enable efficient installation. The first clutch 310 is designed to selectively couple the gear 318 with a gear 326 that is arranged coaxial to the first countershaft 308. However, when the first clutch is disengaged, the gear 326 independently rotates with regard to the first countershaft 308.

The gear 318 on the first countershaft 308 meshes with a gear 330 that is coaxial to the second countershaft 312. Additionally, during disengaged of the second clutch 314, the gear 330 independently rotates in relation to the second countershaft 312. Conversely, during engagement of the second clutch 314 the gear 330 drives rotation of a gear 332 that is fixedly coupled to the second countershaft 312. In turn, the gear 332 meshes with a gear 334 on an output shaft 336. The output shaft 336 includes flanges 338 at opposing axial ends.

To achieve a compact drive unit envelope, and allow the clutches to be packaged on the countershafts, the gear 318 has a lateral position along the first countershaft 308 that is different from the gear 332 along the second countershaft 312. In this way, the second clutch 314 may be positioned in an overlapping lateral position in relation to the first clutch 310.

An axial distance 340 between the flanges 338 is less than an axial distance 342 between the rotor shafts 343 and 344, in the electric machines 303 and 304, respectively. This decreased axial width in relation to the output allows the electric drive unit to be effectively packaged in certain vehicles that, for example, have stringent demands with regard to the size of the output shaft such as loader type vehicle. The use of a single gear on the output shaft 336, that is enabled by the upstream clutch and gearing arrangement, allows this reduced width to be achieved while maintaining multiple operational transmission ratios.

Bearings 346 are coupled to opposing sides of the first countershaft 308 and bearings 348 are similarly coupled to opposing sides of the second countershaft 312. The bearings 346 may be offset to the left (on a lateral axis) from the bearings 348 to accommodate for effective packaging of the gearing and clutches on the countershaft and allow the transmission to achieve desired operational gear ratios. Further, bearings 350 are coupled to opposing sides of the output shaft 336 which are outboard from the gear 334 but inboard from the flanges 338. However, alternate suitable transmission bearing arrangements may be used in alternate examples. For instance, additional bearings may be provided on the shafts adjacent to the gears 316, 318, and/or 332.

Further, as illustrated, the first clutch 310 is positioned vertically below the second clutch 314 which allows the transmission to attain a targeted drop as well as operating gear ratio values.

The electric drive unit 300 may further include a lubrication system 352 with a scavenger pump 354. The scavenger pump 354 includes a pick-up 356 positioned in a sump 358 in the housing 324. As such, the pick-up 356 may be positioned vertically below the gear 334. In this way, the lubrication system 352 removes lubricant (e.g., oil) from the transmission 302 during operation, thereby reducing churning losses. As depicted, the scavenger pump 354 is positioned external to the transmission housing 324. However, lubrication system layouts with the scavenger pump positioned within the housing have been envisioned.

The lubrication system 352 may further include a reservoir 360 as well as other components such as filters, additional pumps, conduits, spray nozzles, and the like. As such, the lubrication system 352 may deliver lubricant to transmission components such as the clutches, bearings, and/or other rotating components, as denoted by arrow 362.

The housing 324 is illustrated as a split housing that includes a first section 364 and a second section 366.

However, other suitable housing designs may be used in other examples such as three or four-piece housing designs. The first section 364 encloses and supports bearings on the left side of the transmission (in the frame of reference of FIGS. 3A and 3B) while the second section 366 encloses and supports bearings on the right side of the transmission. Due to the decreased axial width of the output shaft 336 in comparison to the input shaft 306 a lower section 368 of the housing has a reduced width 370. The transmission housing 324 is further coupled to the electric machine enclosures 372 and 374 of the first and second electric machines, respectively. Electrical interfaces 376 and 378, illustrated as bus bars, are included in the electric machines 303, 304 in the illustrated example. To elaborate, the bus bars may extend inwardly to increase drive unit compactness and avoid undesirable cable interaction with surrounding vehicle systems. However, other suitable electric interfaces for the motors may be used, in alternate examples.

Rotational axes 380 of the rotor shafts 343, 344 which are coaxial to the rotational axis of the input shaft 306, a rotational axis 382 of the first countershaft 308, a rotational axis 384 of the second countershaft 312, and rotational axes 386 of the flanges 338 which are coaxial to the rotational axis of the output shaft 336 are provided for reference. In the illustrated embodiment, the electric machines 303, 304 are coaxial to the input shaft 306 and the countershafts 308, 312 as well as the output shaft 336 are parallel to the input shaft but spaced away therefrom. However, in other embodiment, the electric machines may not be coaxially arranged with regard to the input shaft. For instance, the electric machines may be perpendicularly arranged with regard to the input shaft, and bevel gears may be used to rotationally couple the machines to the input shaft.

Figure 4:
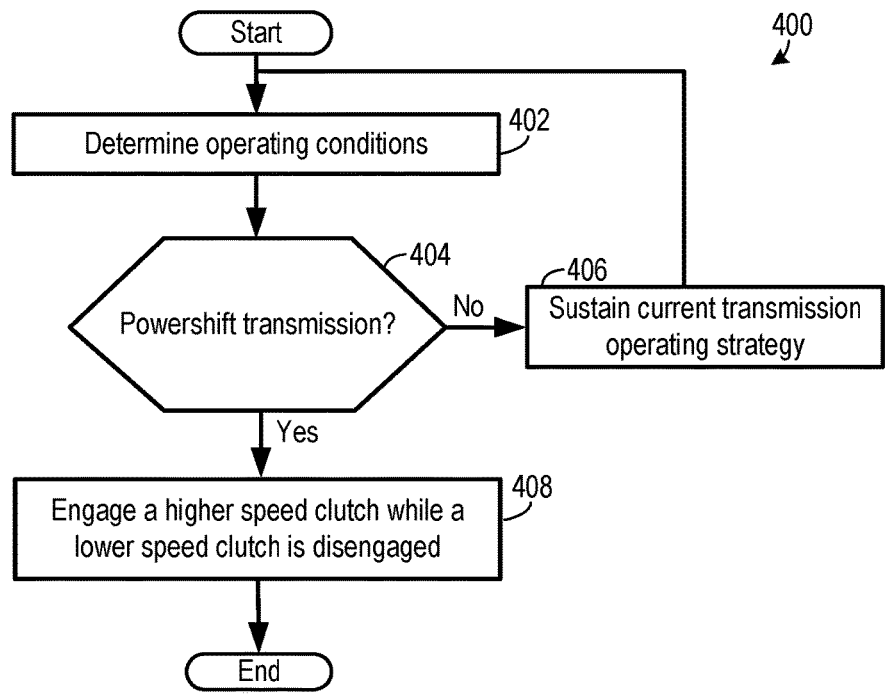
FIG. 4 is a method for operation of a multi-speed transmission in an electric drive unit.

FIG. 4 shows a method 400 for operation of a transmission system. The method 400 may be carried out by any of the transmission systems or combinations of the transmission system described herein with regard to FIGS. 1-3B. However, the method 400 may be carried via other suitable transmissions, in other examples. Furthermore, the method 400 may be implemented by a controller that includes a process and memory, as previously discussed.

At 402, the method includes determining operating conditions. The operating conditions may include input device position (e.g., gearshift lever position), clutch configuration, transmission speed, motor speed, vehicle speed, vehicle load, ambient temperature, and the like. The operating conditions may be ascertained via sensor inputs, modeling, look-up tables, and other suitable techniques.

Next at 404, the method includes judging if a powershift in the transmission should be implemented. Such as determination may be carried out responsive to vehicle speed surpassing a threshold value, in one example. In other examples, operator interaction with gear selector may initiate powershift operation.

If it is determined that a powershift should not occur (NO at 404) the method moves to 406 where the method includes sustaining the current transmission operating strategy. For instance, the transmission may be maintained in a lower gear.

Conversely, if it is determined that a powershift should occur (YES at 404) the method moves to 408 where the method includes engaging a higher speed clutch while disengaging a lower speed clutch while power delivery from both electric machines to the transmission is sustained to transition from a lower gear to a higher gear. In this way, the shift may occur with little or no power interruption, if wanted. It will also be understood that the lubrication system may be continuously operated during implementation of method 400. As such, the method may include steps related to operation of the lubrication system such as transferring lubricant to a scavenger pump via a pick-up tube which is positioned in the sump of the transmission. In this way, lubricant can be removed from the transmission to reduce churning losses, if wanted.

Figure 5:
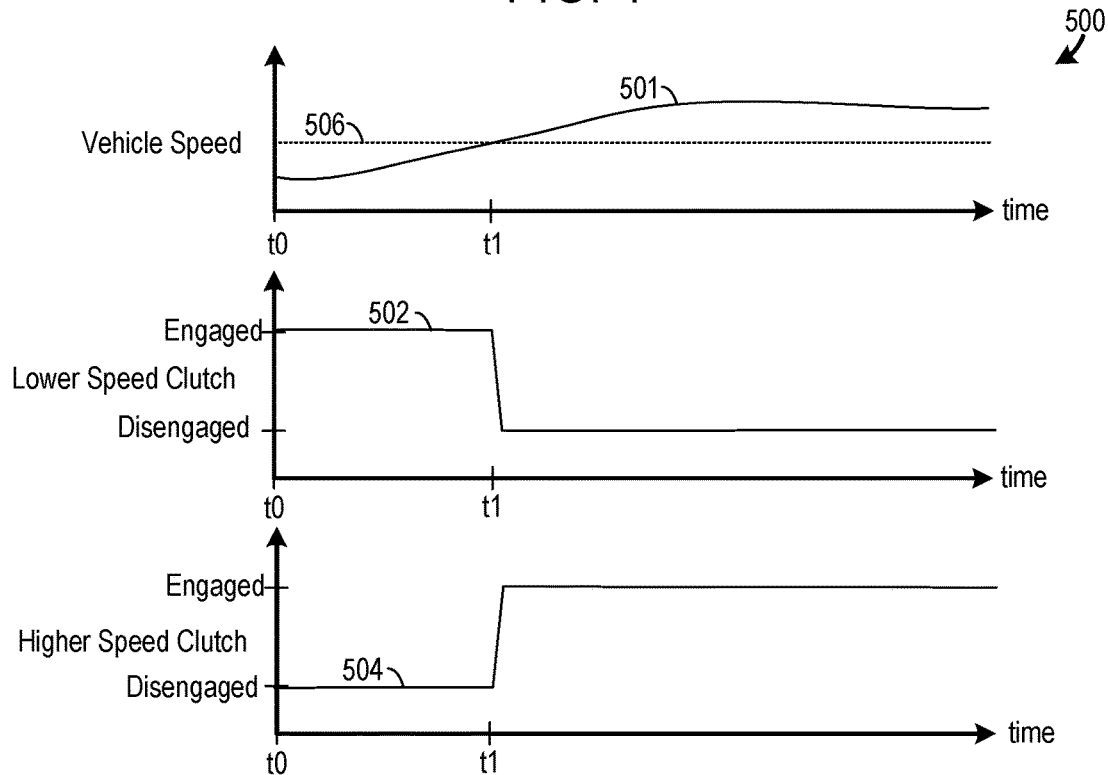
FIG. 5 is a timing diagram for a use-case transmission control strategy.

FIG. 5 illustrates a timing diagram 500 of a use-case control strategy for a transmission system, such as any of the previously described transmissions or combinations of the transmissions. In each graph, time is indicated on the abscissa and increases from left to right. The ordinate for plot 501 indicates vehicle speed. The ordinates for plots 502 and 504 indicate the operational states ("Engaged" and "Disengaged") of the lower and higher speed clutches.

From t0 to t1 the vehicle speed increases and at t1 the speed surpasses a threshold value 506. Responsive to the vehicle speed surpassing the threshold value a powershifting event occurs where the lower speed clutch transitions into a disengaged state and the higher speed clutch transitions into an engaged state. It will be understood that the specific clutch control strategy may be more nuanced, in practice. For instance, clutch pressure in the second clutch may be less abruptly ramped up to allow a smoother transition into the second gear to occur and reduce the likelihood of unwanted noise, vibration, and harshness (NVH).

The technical effect of the transmission systems and operating methods herein is to efficiently transition between the transmission's discrete gears with a decreased amount of power interruption and/or provide a technique which allows the transmission to achieve a higher gear ratio for lower speed operation and a lower gear ratio for higher speed operation in a space efficient package.

FIGS. 3A and 3B are drawn approximately to scale. Although other relative component dimensions may be used, in other embodiments.

FIGS. 1-2B and 3A-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system in an electric drive unit is provided that comprises an input shaft rotationally coupled to each of a first electric machine and a second electric machine; a first clutch arranged coaxial to a first countershaft, wherein a first gear is fixedly coupled the first clutch and meshes with a second gear that is fixedly coupled to the input shaft; and a second clutch arranged coaxial to a second countershaft and spaced away from the first countershaft; a third gear fixedly coupled to the second clutch and meshes with the first gear; wherein the first clutch and the second clutch are configured to shift the transmission system between multiple gear ratios and deliver mechanical power to an output shaft that is spaced away from the second countershaft.

In another aspect, a method for operation of a transmission system in an electric drive unit is provided that comprises transitioning between a first gear ratio and a second gear ratio via selective engagement and disengagement of a first friction clutch and a second friction clutch; wherein the transmission system includes: an input shaft rotationally coupled to each of a first electric machine and a second electric machine; the first friction clutch arranged coaxial to a first countershaft; and the second friction clutch arranged coaxial to a second countershaft and spaced away from the first countershaft; and transferring mechanical power from one of the first and second friction clutches to an output shaft that is spaced away from the second countershaft. Further, in one example, the method may further comprise flowing a lubricant to a scavenger pump through a pick-up of the scavenger pump that is positioned in a sump of a housing, wherein the housing at least partially encloses the first friction clutch and the second friction clutch. Still further, in one example, the method may further comprise transferring mechanical power from the output shaft to at least two drive axles.

In yet another aspect, an electric drive unit for an electric vehicle (EV) is provided that comprises a transmission system comprising: an input shaft rotationally coupled to each of a first electric machine and a second electric machine; a lower gear clutch arranged coaxial to a first countershaft, wherein a first gear is fixedly coupled to the lower gear clutch and meshes with a second gear that is fixedly coupled to the input shaft; and a higher gear clutch arranged coaxial to a second countershaft, wherein a third gear is fixedly coupled to the higher gear clutch, meshes with the first gear, and is arranged coaxial to the second countershaft.

In any of the aspects or combinations of the aspects, transitioning between the first gear ratio and the second gear ratio may include engaging the first friction clutch while disengaging the second friction clutch to shift from the second gear ratio to the first gear ratio.

In any of the aspects or combinations of the aspects, transitioning between the first gear ratio and the second gear ratio may include engaging the second friction clutch while disengaging the first friction clutch to shift from the first gear ratio to the second gear ratio.

In any of the aspects or combinations of the aspects, the first clutch may be configured to, when engaged, rotationally couple the first gear to a fourth gear; the fourth gear may be arranged coaxial to the first countershaft and meshes with a fifth gear that is fixedly coupled to the second countershaft; the second clutch may be configured to, when engaged, rotationally couple the third gear to the fifth gear; and the fifth gear may mesh with a sixth gear fixedly coupled to the output shaft.

In any of the aspects or combinations of the aspects, the first and second clutches may be friction clutches and wherein the third gear and the fifth gear are positioned on opposing lateral sides of the second clutch.

In any of the aspects or combinations of the aspects, the transmission system may further comprise a scavenger pump including a pick-up positioned in a sump of a housing that at least partially encloses the first clutch and the second clutch.

In any of the aspects or combinations of the aspects, the output shaft may include a first flange and a second flange that have an axial separation that is less than an axial separation between the first electric machine and the second electric machine.

In any of the aspects or combinations of the aspects, a single gear may be fixedly coupled to the output shaft and the output shaft is rotationally coupled to a first axle and a second axle.

In any of the aspects or combinations of the aspects, the first electric machine and the second electric machine may be positioned on opposing axial sides of the input shaft.

In any of the aspects or combinations of the aspects, the lower gear clutch may be configured to, when engaged, rotationally couple the first gear to a fourth gear; the fourth gear may be coupled to the first countershaft via a first bearing and meshes with a fifth gear that is fixedly coupled to the second countershaft; the third gear may be coupled to the second countershaft via a second bearing; the higher gear clutch may be configured to, when engaged, rotationally couple the third gear to the fifth gear; and the fifth gear meshes with a sixth gear that is fixedly coupled to the output shaft.

In any of the aspects or combinations of the aspects, the lower gear clutch and the higher gear clutch may be wet friction clutches and wherein the first gear and the fourth gear may be positioned on opposing axial sides of the lower gear clutch and the third gear and the fifth gear are positioned on opposing axial sides of the higher gear clutch.

In any of the aspects or combinations of the aspects, the electric drive unit may further comprise a scavenger pump including pick-up positioned in a sump of a housing that at least partially encloses the lower gear clutch and the higher gear clutch, wherein the scavenger pump is configured to deliver lubricant to the lower gear clutch and the higher gear clutch.

In any of the aspects or combinations of the aspects, the first electric machine may be positioned coaxial to the second electric machine.

In any of the aspects or combinations of the aspects, a single gear may be fixedly coupled to the output shaft; and the output shaft may include a first flange and a second flange that have an axial separation that is less than an axial separation between the first electric machine and the second electric machine.

In any of the aspects or combinations of the aspects, the lower gear clutch and the higher gear clutch may be wet friction clutches.

In any of the aspects or combinations of the aspects, the EV may be a battery electric vehicle (BEV).

In any of the aspects or combinations of the aspects, the first electric machine and the second electric machine may be coaxially arranged.

In another representation, an electric drive in an all-electric vehicle is provided that includes two electric motor-generators that are rotationally coupled to and coaxially arranged with an input shaft; a first countershaft with a first friction clutch arranged coaxial thereto, where the first friction clutch includes a first clutch drum and a first clutch hub each coupled to a gear in a first pair of gears; and a second countershaft with a second friction clutch arranged coaxial thereto, where the second friction clutch includes a second clutch drum and a second clutch hub each coupled to a gear in a second pair of gears that meshes with the first pair of gears.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a transmission system in an electric drive unit, comprising:
    transitioning between a first gear ratio and a second gear ratio via selective engagement and disengagement of a first friction clutch and a second friction clutch;
    wherein the transmission system includes:
        an input shaft rotationally coupled to each of a first electric machine and a second electric machine;
        the first friction clutch arranged coaxial to a first countershaft; and
        the second friction clutch arranged coaxial to a second countershaft and spaced away from the first countershaft; and
    transferring mechanical power from one of the first and second friction clutches to an output shaft that is spaced away from the second countershaft;
    wherein the transmission system further includes:
        a first gear that is directly fixedly coupled to the input shaft such that it rotates therewith; and
        a second gear that is directly fixedly coupled to the first countershaft such that it rotates therewith and directly coupled to a clutch drum of the first friction clutch;
        wherein the first gear solely meshes with the second gear; and
    wherein the first countershaft is positioned vertically above the second countershaft in relation a vertical axis that is parallel to a gravitational axis.

2. The method of claim 1, wherein transitioning between the first gear ratio and the second gear ratio includes engaging the first friction clutch while disengaging the second friction clutch to shift from the second gear ratio to the first gear ratio.

3. The method of claim 1, wherein transitioning between the first gear ratio and the second gear ratio includes engaging the second friction clutch while disengaging the first friction clutch to shift from the first gear ratio to the second gear ratio.

4. The method of claim 1, further comprising flowing a lubricant to a scavenger pump through a pick-up of the scavenger pump that is positioned in a sump of a housing, wherein the housing at least partially encloses the first friction clutch and the second friction clutch.

5. The method of claim 1, further comprising transferring mechanical power from the output shaft to at least two drive axles.

6. The method of claim 1, wherein the second countershaft includes a third gear that is directly coupled thereto and meshes with a fourth gear that is directly coupled to the output shaft.

7. The method of claim 6, wherein the fourth gear solely meshes with the third gear.

8. The method of claim 1, wherein the output shaft is positioned vertically below the second countershaft in relation the vertical axis that is parallel to the gravitational axis.

9. The method of claim 1, wherein the electric drive unit is included in an all-electric vehicle.

10. The method of claim 1, wherein the transmission system includes a transmission housing which is coupled to a first electric machine enclosure and a second electric machine enclosure which enclose the first electric machine and the second electric machine, respectively, wherein the first electric machine enclosure and the second electric machine enclosure are positioned on opposing sides of the transmission housing.

11. The method of claim 1, wherein only clutches in the transmission system are the first friction clutch and the second friction clutch.

12. The method of claim 1, wherein:
the output shaft includes flanges at opposing ends of the output shaft and the first electric machine;
the second electric machine include a first rotor shaft and a second rotor shaft; and
an axial distance between the flanges is less than an axial distance between inboard ends of the first rotor shaft and the second rotor shaft.

13. The method of claim 12, wherein:
the flanges are positioned vertically below a first electric machine enclosure and a second electric machine enclosure in relation the vertical axis that is parallel to the gravitational axis; and
the first electric machine enclosure and the second electric machine enclosure enclose the first electric machine and the second electric machine, respectively.

* * * * *